(12) United States Patent
Köpf et al.

(10) Patent No.: US 11,117,747 B2
(45) Date of Patent: Sep. 14, 2021

(54) FEED UNIT FOR A PROCESSING PLANT, IN PARTICULAR FOR A CRUSHING OR SCREENING STATION

(71) Applicant: Kleemann GmbH, Göppingen (DE)

(72) Inventors: Reiner Köpf, Gingen an der Fils (DE); Christian Knoblich, Stuttgart (DE); Wolfgang Schmid, Rechberghausen (DE)

(73) Assignee: Kleemann GmbH

( * ) Notice: Subject to any disclaimer, the term of this patent is extended or adjusted under 35 U.S.C. 154(b) by 0 days.

(21) Appl. No.: 16/893,519

(22) Filed: Jun. 5, 2020

(65) Prior Publication Data

US 2020/0391946 A1  Dec. 17, 2020

(30) Foreign Application Priority Data

Jun. 11, 2019 (DE) ...................... 10 2019 115 871.0

(51) Int. Cl.
  *B65G 11/02* (2006.01)
  *B02C 21/02* (2006.01)
  (Continued)

(52) U.S. Cl.
  CPC ............ *B65G 11/026* (2013.01); *B02C 21/02* (2013.01); *B02C 23/02* (2013.01); *B07B 1/005* (2013.01); *B65G 2811/09* (2013.01)

(58) Field of Classification Search
  CPC ......... B02C 21/02; B02C 21/03; B02C 23/02; B07B 1/005; B65G 2811/09; B65G 11/026

(Continued)

(56) References Cited

U.S. PATENT DOCUMENTS 4,688,679 A * 8/1987 Lindgren .............. B07B 13/003
                                                    209/691
6,976,591 B2 * 12/2005 Reding ................. B07B 13/003
                                                    209/692

FOREIGN PATENT DOCUMENTS

CA        3061177 A1    10/2019
DE   102017112091 A1    12/2018

OTHER PUBLICATIONS

Espacenet Search, Jun. 5, 2021, 2021.*

* cited by examiner

*Primary Examiner* — Gene O Crawford
*Assistant Examiner* — Lester Rushin, III
(74) *Attorney, Agent, or Firm* — Lucian Wayne Beavers; Patterson Intellectual Property Law, PC

(57) ABSTRACT

The invention relates to a feed unit for a processing plant, in particular for a crushing or screening station, having a feed chute which has a chute beam (90), wherein the chute beam (90) has a bottom (92), wherein the bottom (92) extends in the conveying direction (V) of the feed chute, wherein at least one beam (130) extending in the conveying direction (V) is arranged in the area of the underside of the bottom (92) and supports the bottom (92), wherein furthermore a bracket (140) is provided, which supports at least one vibration exciter (150), and wherein the bracket (140) is connected to the beam (130). A particularly resilient and in continuous operation durable feed unit is created according to the invention by the beam forming a closed hollow section or at least a wall segment of the beam (130) in conjunction with a reinforcing section (120) connected thereto forming a closed hollow section, and the hollow section extending with an angular deviation in the range of +/−15° in the direction of the excitation direction.

18 Claims, 8 Drawing Sheets

(51) Int. Cl.
*B02C 23/02* (2006.01)
*B07B 1/00* (2006.01)

(58) Field of Classification Search
USPC .................... 209/921, 920; 193/2 B, 2, 3, 25
See application file for complete search history.

FEED UNIT FOR A PROCESSING PLANT, IN PARTICULAR FOR A CRUSHING OR SCREENING STATION

BACKGROUND OF THE INVENTION

Field of the Invention

The invention relates to a feed unit for a processing plant, in particular for a crushing or screening station, having a feed chute which has a chute beam, wherein the chute beam has a bottom, wherein the bottom extends in the conveying direction of the feed chute, wherein at least one beam extending in the conveying direction is arranged in the area of the underside of the bottom and supports the bottom, wherein furthermore a bracket is provided, which supports at least one vibration exciter, and wherein the bracket is connected to the beam.

Description of the Prior Art

Processing plants are used for various purposes. They are used, for instance, to crush and/or screen recycling and/or rock material during processing. These machines can be used either as mobile or as stationary units. A feed unit is used to feed the material to be crushed into the plant. Excavators are usually used for this purpose. The excavator deposits the material to be crushed in a conveyor chute of the feed unit. Starting from the feed unit, a conveyor device is used to convey the material to be crushed to a screening or crusher unit in the conveying direction. The conveyor device transports the material by means of motor-driven vibration exciters. For instance, eccentric vibrators are used. These eccentric vibrators are connected to a beam, which is connected to the chute beam of the feed unit. The vibration exciters cause the feed chute to vibrate via the beam in such a way that a conveying effect is achieved in the conveying direction towards a downstream process unit, for instance a screening unit.

Such a plant is known from DE 10 2017 112 091 A1.

The material placed on the feed chute has a high weight. Due to this weight and the vibration induced by the vibration exciter, very high loads act on the chute beam. To reduce these loads, it is recommended to keep the weight of the moving parts of the feed unit as low as possible. However, this is countered by the requirement to provide a stable structure that is able to withstand any occurring loads.

SUMMARY OF THE INVENTION

The invention addresses the problem of providing a feed unit of the type mentioned above which reliably withstands high loads in continuous operation.

This problem is solved by the beam forming a closed hollow section or at least a wall segment of the beam in conjunction with a reinforcing section connected thereto forming a closed hollow section, and the hollow section extending at an angular deviation in the range of +/−15° in the direction of the excitation direction.

The hollow section braces the beam to provide in particular a high axial modulus of resistance to bending and to render it resistant (high polar modulus of resistance) to torsional stresses. In addition, the effective area for the transmission of tensile and compressive forces between the vibration exciter and the feed chute is increased. According to the invention, a stable box structure is formed in this way, which reliably resists even high loads and which in addition has a low component weight. In accordance with the invention, it is further provided that the hollow section extends in the direction of the excitation direction at an angular deviation in the range of +/−15°. The forces generated by the excitation device are accordingly introduced into the hollow section in the direction of its longitudinal extension or essentially in the direction of its longitudinal extension. This has the effect of preventing or minimizing stresses acting transversely to the longitudinal extension, i.e. adverse stresses. This measure also reduces the elastic deformation of the beam during vibration operation to a minimum. In this way, less excitation energy is dissipated, i.e. a higher degree of efficiency can be achieved.

According to a preferred embodiment variant of the invention, it may be provided that the hollow section has an end segment at each of its longitudinal ends and that the first end segment of the hollow section is connected to the bottom and the second end segment is connected to the bracket. In this way, the force generated by the vibration exciter can be introduced directly into the hollow section and the beam and be transferred into the chute beam. This creates a particularly stable structure. A stable connection of the end segments to the bottom of the chute beam and the bracket can be made, for instance, and preferably by means of a welded joint.

According to the invention, it can in particular also be provided that the hollow section extends at an angle smaller than 90° to the conveying direction or to the bottom, wherein the angle is designed in particular as an acute angle in the range between 20° and 50°, particularly preferably in the range between 25° and 35°, in particular 30°. In this way the section lying essentially in the line of action of the excitation force is achieved in an advantageous manner. I.e. no undesired moduli are generated in the structure.

If the invention is such that at least one bracing element is arranged in the area of the end segment of the hollow section facing the bracket, wherein the bracing element is connected both to the outside of the hollow section and to the bracket, and that the bracing element projects laterally beyond the outer circumference of the hollow section, at least in some areas, then the particularly loaded connection area between the bracket and the beam or the hollow section is additionally braced, discontinuities in stiffness are precluded and in that way the risk of fatigue fracture in this area is reduced.

According to the invention, it may also be provided that the beam has a wall element adjoining two spacers of the hollow section and that the spacers keep a section segment of the hollow section at a distance from the wall element. This design results in a box-like structure, in which the two spacers keep the section segment at a distance from the beam. This spacing ensures a particularly high torsional stiffness and a high axial modulus of resistance against bending using very few components.

In particular, it may be provided that the two spacers and the section segment (if necessary with further section areas) form a uniform reinforcement section, which is then connected, preferably welded, to the wall element of the beam. This results in a stable construction having a low component weight. In particular, this section part can also be formed integrally from a punched and bent part. However, it is also conceivable that this section part is composed of several individual parts that are interconnected.

It is also conceivable, however, that a closed hollow section is formed using two spacers and one section segment, wherein this hollow section has an additional section segment, which can then be connected to the wall element of the beam. Such a closed hollow section can then be placed as a prefabricated unit on the wall element of the beam and connected, preferably welded, thereto.

If it is intended that the wall element and/or the section segment has/have a depression, which is preferably recessed in the direction of the interior space enclosed by the hollow section, then further bracing of the hollow section in favor of a higher load-bearing capacity results. If the depression is recessed towards the interior, a space-saving design is achieved. Of course, it is also possible to introduce a depression in the hollow section towards the outside of the hollow section.

It is particularly conceivable that a wall element is connected to each of the two spacers, wherein the two wall elements are at an angle of more than 90° from each other. The two angled wall elements can easily be used to increase the overall width of the hollow section transversely to the conveying direction. This increases the flexural rigidity when bending around an axis perpendicular to the conveying direction and at the same time increases the torsional strength in a simple way. In addition, it may be provided that the two wall elements are interconnected via at least one connection segment and wherein preferably two connection segments are provided, which are arranged at an angle from each other.

The connection segment(s) close(s) the hollow section to form a closed structure. If the two connection segments are at an angle from each other, this results in a bead-like depression which can be indented towards the inside or towards the outside of the hollow section and which then contributes to further bracing of the hollow section.

As mentioned above, the hollow section may be formed by the beam itself. For instance, the material of the beam can be formed into a hollow section in several bending steps and then the open side of the section can be welded closed.

It is also conceivable, however, that the reinforcing section forms a component which is placed on a side surface of the wall element of the beam and welded thereto, wherein the weld seams extend in the direction of the longitudinal extension of the hollow section. In particular, the beam can then be manufactured having a section thickness deviating from that of the reinforcement section. This permits a load-optimized design. In addition, the reinforcing section can be easily manufactured as a separate component and then connected to the beam.

A conceivable variant of invention can be such that ribs extending transversely to the conveying direction are arranged on the underside of the bottom and that the ribs are connected, preferably welded, to the outside of the hollow section and/or that bracing ribs extending transversely to the conveying direction are arranged on the underside of the bottom.

It may also be provided that two bracing ribs and/or at least two ribs are interconnected by means of at least one connection segment extending in the conveying direction.

The bracing ribs or ribs brace the bottom and thus permit a stable and light design for the chute beam. When the ribs are connected to the hollow section, the strength is optimized further.

In conjunction with the connection segment a stiff box section is obtained. This is particularly advantageous if it is intended to interconnect two adjacent bracing ribs by means of a flange and to connect a vibration element, preferably a spring, to the flange.

Particularly advantageously, provision may be made to arrange two hollow section segments at a distance from each other transversely to the conveying direction. In this case, it is particularly recommended to use two hollow section segments of identical design, which are in particular arranged symmetrically to each other.

It has been shown that an arrangement having two hollow section segments provides comparatively higher component stiffness than a single hollow section segment, which has the same size as the two hollow section segments conjointly.

In this context, it may also be further provided that the component width extending transversely to the conveying direction, which results from the width of the two hollow section segments plus the width of the space between the hollow section segments, is at least 70% of the width of the bracket of the vibration exciter(s) in this direction. Surprisingly, it has been shown that this simple measure results in only a small elastic deformation of the bracket, even in extremely stressed continuous operation.

To avoid weakening the hollow section, it is recommended not to perforate the hollow section(s) in the area of its/their longitudinal extension, in particular that there shall be no openings and/or penetrations of other components, especially the bracing ribs.

BRIEF DESCRIPTION OF THE DRAWINGS

The invention is explained in greater detail below based on an exemplary embodiment shown in the drawings. In the Figures.

DETAILED DESCRIPTION

Figure 1:
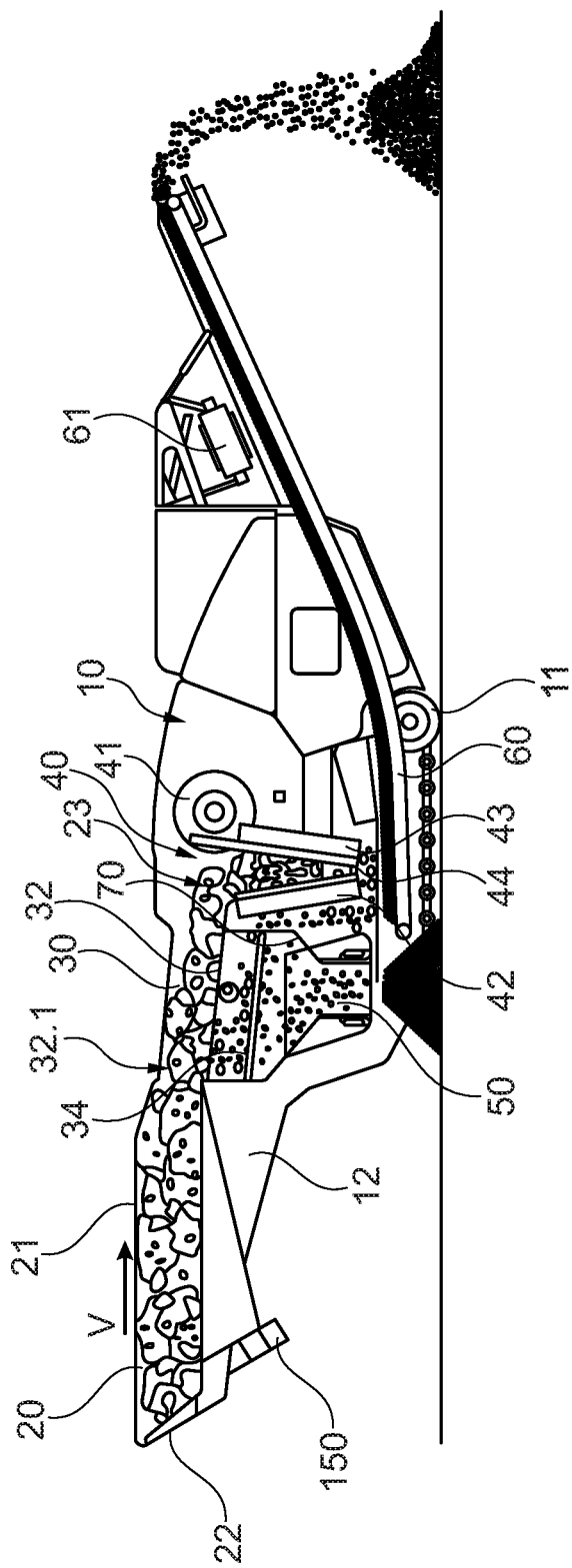
FIG. 1 shows a side view of a schematic principle representation of a mobile crushing plant.
Figure 2:
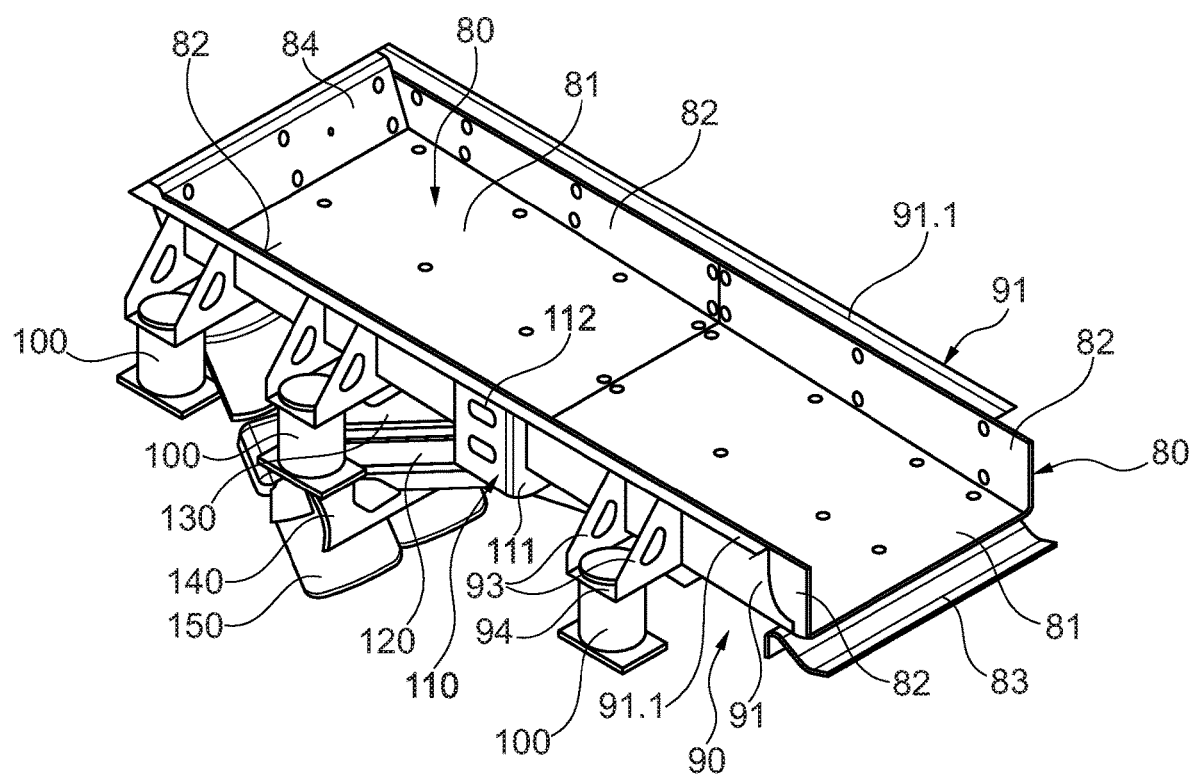
FIG. 2 shows a front view of a feed chute of a feed unit of the mobile crushing plant in accordance with FIG. 1.

FIG. 1 shows a processing plant, namely a mobile crushing plant 10, as it is typically used for crushing recycling material, rocks or other mineral material. This mobile crushing plant 10 has a machine chassis supported by two crawler tracks 11.

The crushing plant 10 is equipped with a feed unit 20, which is usually designed as a hopper-shaped feed unit 20 having two hopper side walls 21 and one hopper rear wall 22. The feed unit 20 is supported by a boom 12 of the machine chassis.

This feed unit 20 can be used to fill the crushing plant 10 with the material to be crushed. The feed unit 20 has a transport device at the bottom, which in particular has a feed chute. This conveyor device is used to feed the material to be crushed to a screening unit 30. A vibration exciter 150 is assigned to the feed unit, which can be designed as an eccentric drive. This vibration exciter 150 can be used to vibrate the feed unit to feed the material conveyed in conveying direction V to the screening unit 30. The fed material is subjected to a screening process in the screening unit 30. The plant design can be selected such that the vibration exciter 150 causes not only the feed chute but also the screening unit 30 to vibrate for transport purposes. In particular, in conjunction with the inclined arrangement of the feed chute and/or one or more screen decks, a transport effect similar to that of a vibratory conveyor is achieved as well.

As FIG. 1 shows, the screening unit 30 feeds the coarse rock fraction, which is not screened, to a crusher unit 40 (transfer area 23). The crusher unit 40 is designed to have the shape of a jaw crusher. This crusher unit 40 has two crushing jaws 42, 43 that form a converging gap. The material to be crushed is fed into this gap area. The crusher unit 40 has a fixed crushing jaw 42 and a movable crushing jaw 43. An eccentric drive 41 drives the movable crushing jaw 43.

As FIG. 1 shows, the coarse rock material is crushed in the converging gap. On the bottom side, the crushed and broken rock material exits the crusher unit 40 in the area of a feed opening 44 of the converging gap and falls onto a crusher discharge belt 60 due to gravity. The crusher discharge belt 60 can, as in the present case, be designed as an endlessly circulating conveyor belt.

The crusher discharge belt 60 discharges the crushed rock material and piles it up behind crushing plant 10.

A magnetic separator 61 can be provided in the area of the crusher discharge belt 60 at the crushing plant 10. It is arranged above the material flow, which is routed on the crusher discharge belt 60. Magnetic or magnetizable metal parts in the material flow are magnetically attracted by the magnetic separator 61 and separated from the material flow.

As the drawing shows, the material coming from the feed unit 20 is passed through a pre-screen 32 (e.g. top screen deck) in the screening unit 30. In the process, part of the rock material is singled out. These are pieces of rock which, due to their size, do not have to be sent through crusher unit 40, as they already have a size that corresponds approximately to the rock size that results from crushing by the crusher unit 40. As the drawing shows, a part of this singled out rock fraction is fed directly to the crusher discharge belt 60 in a bypass past the crusher unit 40.

As FIG. 1 shows, there may now be a further lower screen deck 34 in the screen unit 30 below the pre-screen 32. This lower screen deck 34 screens a further, fine partial fraction from the material already screened. It is now partly desired to separate this particularly fine partial fraction, for which a side discharge belt 50 is used. The fine partial fraction is fed onto this endlessly rotating side discharge belt 50, is conveyed out of the working area of crusher 10 and accumulated, as shown in FIG. 1.

Now, discharging the fine sub-fraction is not always desired. Rather, the machine operator wants to have the choice of feeding it separately or conjointly with the coarser screened material directly onto the crusher discharge belt 60. An adjustable flap chute 70 is used for this purpose.

FIGS. 2 to 5 show a part of the feed unit 20, namely the feed chute in an isolated partial view. As these illustrations show, the feed chute has a chute beam 90. The chute beam 90 has a bottom 92 and side walls 91 connected to the sides of the bottom 92 and rising therefrom. The bottom 92 and/or the side walls 91 can be completely or partially covered with wear-resistant inserts 80. The wear-resistant insert 80 can be formed from wear plates, which form a bottom 81 and/or side walls 82 and a rear wall 84. These wear plates of the wear-resistant insert 80 completely or partially cover the bottom 92 and the side walls 91 of the chute beam 90.

Figure 3:
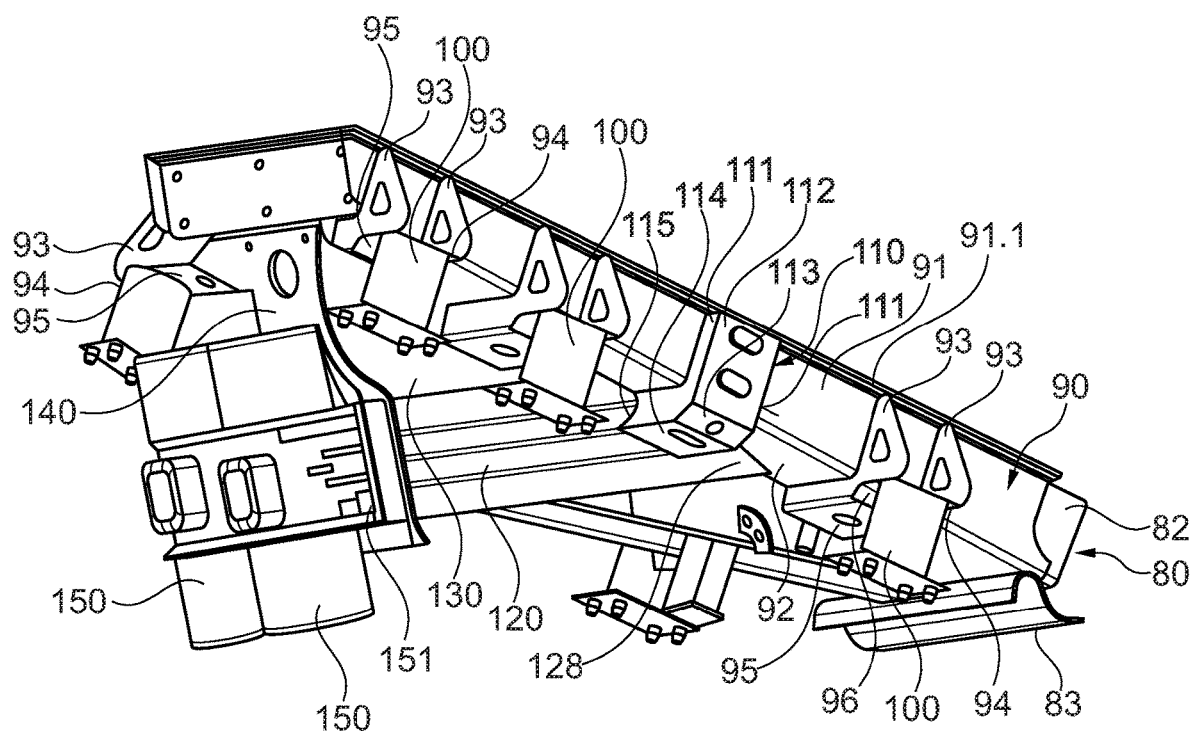
FIG. 3 shows a perspective rear and bottom view of the feed chute in accordance with FIG. 2.

Bracing ribs 93 are provided in the area of the bottom of the feed chute. The bracing ribs 93 are designed such that they reach under the bottom 92 and also at least partially extend over the side walls 91. Preferably, the bracing ribs 93 are welded both to the bottom 92 and to the side walls 91. FIG. 3 shows two adjacent bracing ribs 93 interconnected in a U-shape via a connection segment 95.

A connection segment 96 can also be provided in the area of the longitudinal ends of the bracing ribs 93, which connection segment is at an angle to the connection segment 95 and is connected, preferably welded, thereto.

The two adjacent bracing ribs 93 are each connected to a flange 94 in the area of the side walls 91. This flange 94 is used for coupling a vibration element 100, which may be formed by a spring, for instance.

As FIG. 3 further shows, at least one further bracing element 110 can also be provided below the feed chute. The bracing element 110 has two ribs 111. These can be similar in design to the bracing ribs 93, the difference being that they do not have a flange 94. Correspondingly, the ribs 111 are connected to the connection segments 112 and 113 or 114 such that a closed box structure is formed, which is attached to the bottom 92 on the underside and which rests laterally against the outer sides of the side walls 91.

FIG. 3 shows that a beam 130 is attached to the underside of the bottom 92. The beam 130 may be formed by a sheet metal segment. This sheet metal segment has recesses in a first connection area 131. These recesses are routed laterally up to the bracing ribs 93 and overlap the connection segments 95. Accordingly, the bracing ribs 93 extend over the entire width of the bottom 92. In its first connection area 131, the beam 130 is preferably welded to the underside of the bottom 92, the bracing ribs 93 and the connection segments 95.

Figure 6:
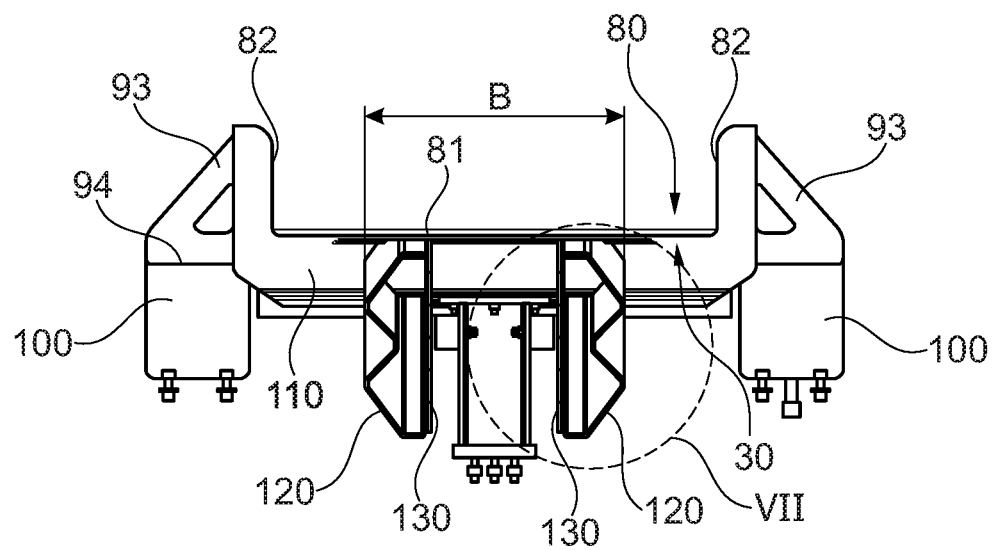
FIG. 6 shows a sectional view of the feed chute as shown in FIGS. 2 to 5 in accordance with the sectional line marked VI-VI in FIG. 4.

As can be seen in FIG. 6, two beams 130 are thus attached to the underside of the bottom 92, wherein the beams 130 are spaced apart to form an interstice. Reinforcing sections 120 are placed on the opposite sides of the beams 130. These reinforcing sections 120 extend at an acute angle to the conveying direction V of the feed chute.

Figure 5:
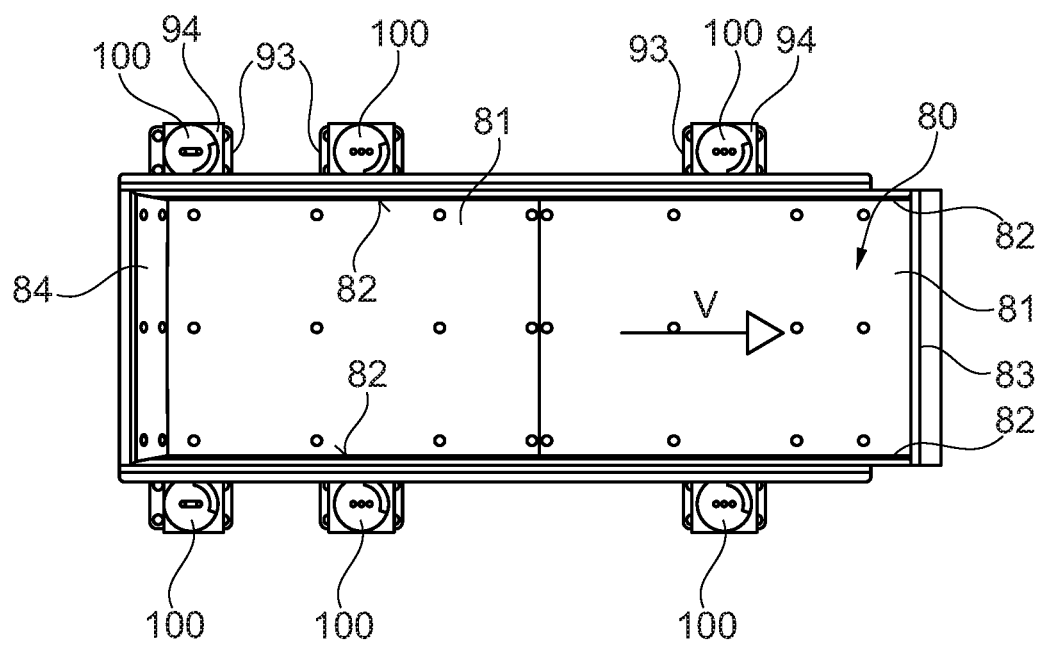
FIG. 5 shows a top view of the feed chute in accordance with FIGS. 2 to 4.

The conveying direction V is marked, for instance, in FIG. 5 and extends along the bottom 92 from the rear wall 84 of the feed chute to a bridging piece 83 located at the end of the feed chute, which transfers the feed chute to the screening unit 30.

Figure 7:
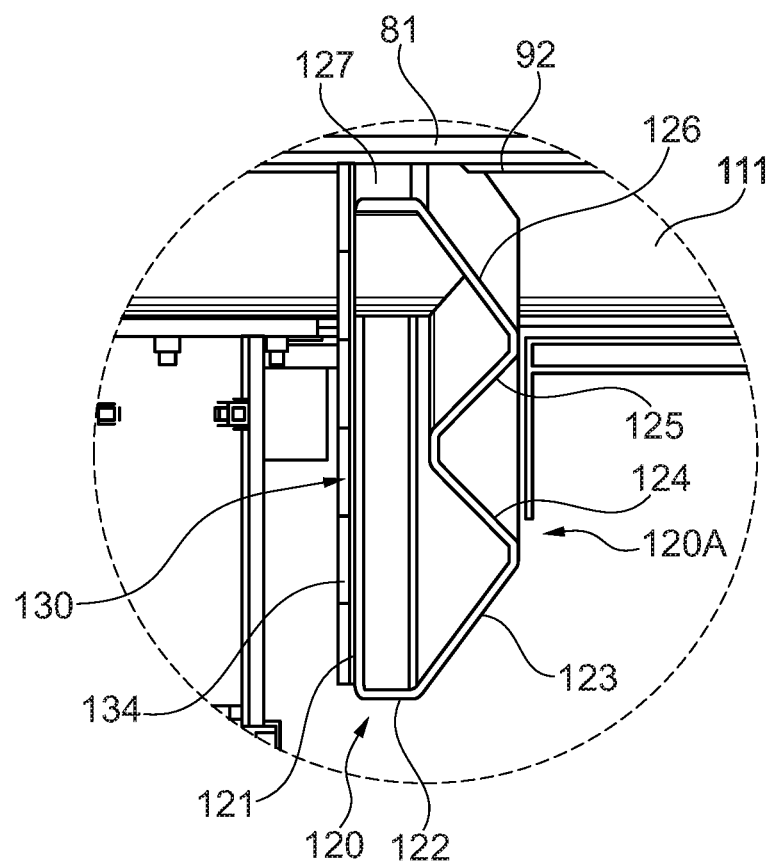
FIG. 7 shows a detail taken from FIG. 6 marked VII there.

The design of the reinforcing section 120 can be seen in FIG. 7. As this illustration shows, the beam 130 can have the shape of a sheet or the beam 130 has at least one sheet-like wall segment.

The reinforcing section 120 has two spacers 122, 127, which are positioned at a wide distance from each other. In addition, a contact segment 121 is bent away from the spacer 122, which contact segment can be placed on the outside of the assigned beam 130. Wall elements 123, 126 are connected to the two spacers 122, 127 at an angle greater than 90°. The two wall elements 123 and 126 are also at an angle from each other. At the ends facing away from the spacers 122, 127, the wall elements 123, 126 are transferred into connection segments 124, 125. The two connection segments 124, 125 are at an angle from each other as well as from the adjacent wall elements 123, 126.

As FIG. 7 shows, the two connection segments 124, 125 form a depression-shaped recess, which is recessed towards the interior of the reinforcing section. This results in a W-shaped design, which has a particularly small footprint. Of course, the recess can also be directed in the opposite direction towards the outside of the reinforcing section 120. It is also conceivable that several of these depression-like recesses are provided on the reinforcing section 120 and/or on the beam 130.

It is also conceivable that the spacers 122, 127 are directly transferred into each other in a box shape via a connection segment, forming a rectangular cross-section.

The free end of the spacer 127 and the contact segment 121 of the reinforcing section rest on the outside of the beam 130. The reinforcing section 120 is then welded to the beam 130 in the area of the outside of the spacer 127 and in the transition area between the spacer 122 and the contact segment 121, wherein the weld seams preferably extend over the entire axial length of the reinforcing section 120. In this way, the reinforcing section 120 and the assigned area of the beam 130 are used to obtain a closed hollow section, as FIG. 7 clearly shows.

Figure 4:
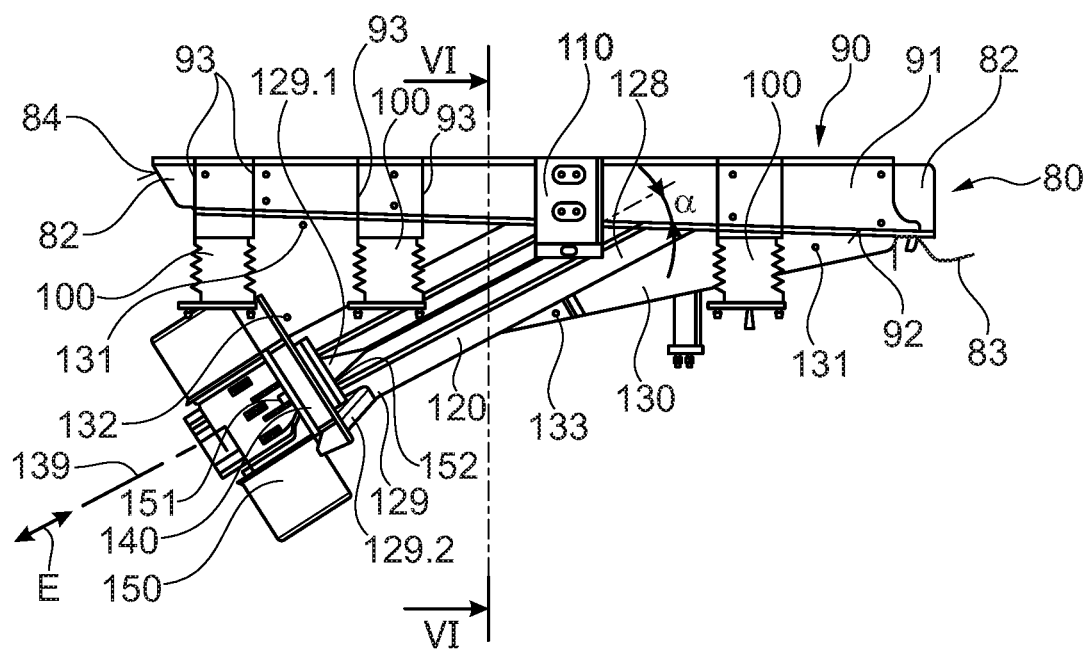
FIG. 4 shows a side view of the feed chute in accordance with FIGS. 2 and 3.

FIG. 4 shows a variant in which a bracing element 129.1 is used. This bracing element 129.1 has two side areas, which are attached to the connection segments 124 and 125 of the reinforcing section 120 and there are welded thereto. In this way the reinforcing section 120 is braced in its end segment 129 facing the bracket 140. The bracket 140 is connected, preferably welded, to the front side of the reinforcing section 120. In addition, the beam 130 can form a second connection section 132 there, to which the bracket 140 can be connected, preferably welded. Finally, it may also be provided that the bracing element 129.1, which protrudes laterally beyond the outer circumference of the reinforcing section 120, rests against the assigned rear end of the bracket 140 and is coupled here.

Furthermore, an additional second bracing element 129.2 can also be provided. This second bracing element 129.2 is also connected to the outside of the reinforcing section 120, for instance in the area of the spacer 122 and the wall element 123 with the reinforcing section 120 and protrudes over the outer circumference of the reinforcing section 120. Furthermore, this second reinforcing element 129.2 is also supported on the back of the bracket 140. The bracket 140 can then also be connected to this second bracing element 129.2.

As FIG. 4 illustrates, the end segment 128 of the reinforcing section 120 opposite the bracket 140 is routed to the bottom 92. In this case as well, the reinforcement section 120 is welded to the bottom 92.

The bracing element 110 is designed to penetrate the hollow sections, thus passing through the outer contour of the reinforcing section 120 and then welded thereto.

The bracket 140 is essentially sheet-shaped, as shown in FIG. 3. It is routed to the bottom 92 and fixed there. In addition, the bracket 140 is also coupled to the beam 130 in the latter's second connection area 132.

Figure 8:
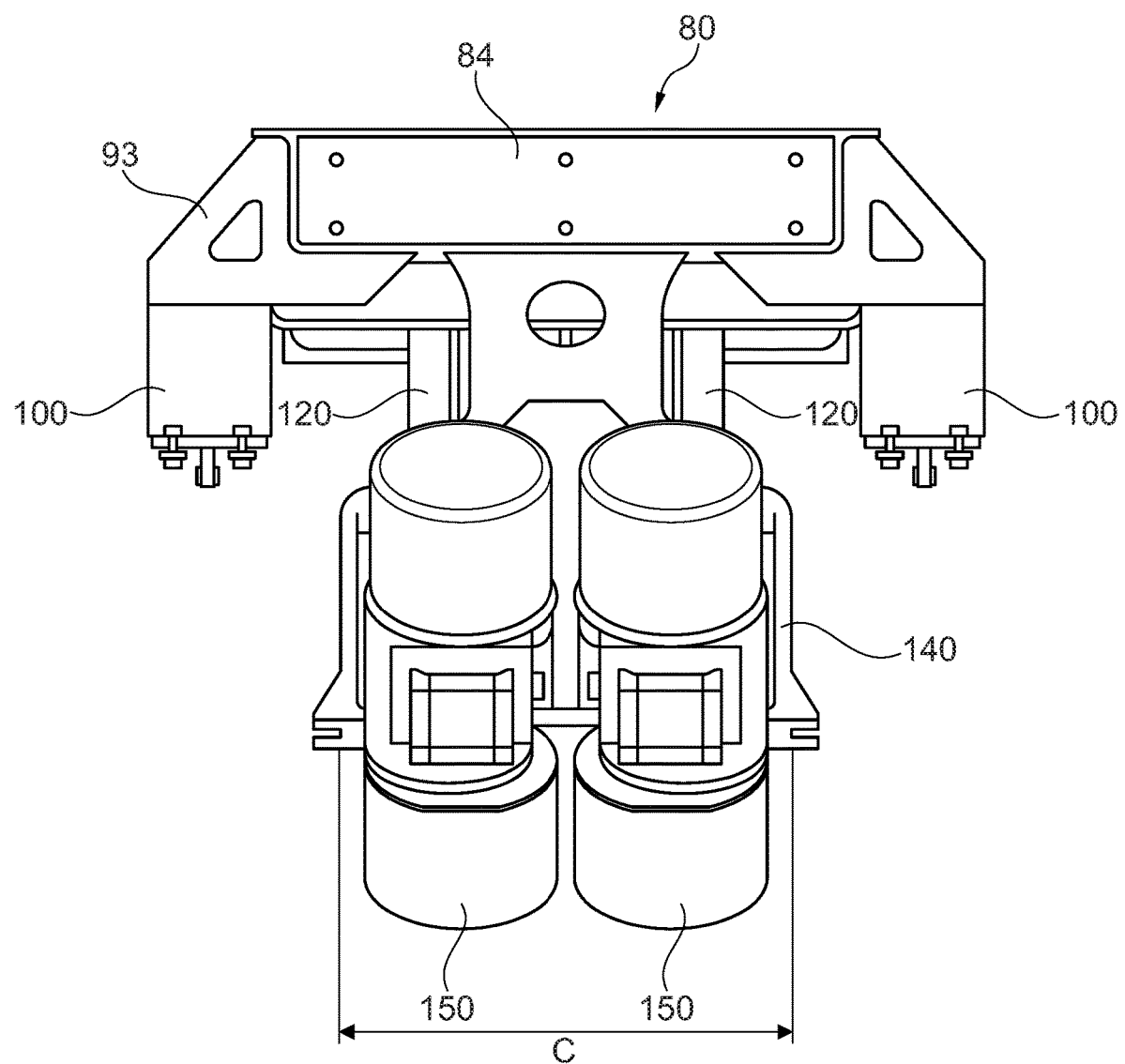
FIG. 8 shows a rear view of the feed chute in accordance with FIGS. 2 to 7.
Figure 9:
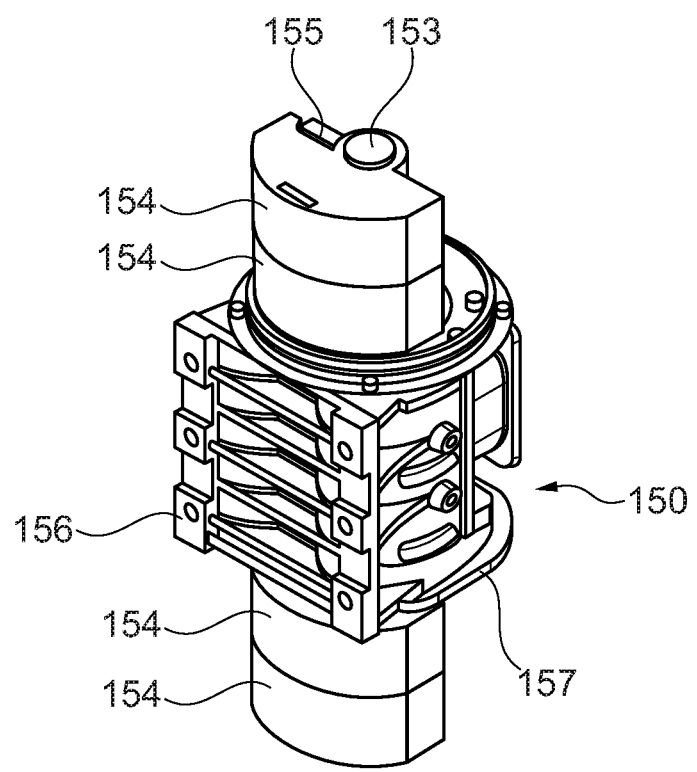
FIG. 9 shows a perspective rear view of a vibration exciter.
Figure 10:
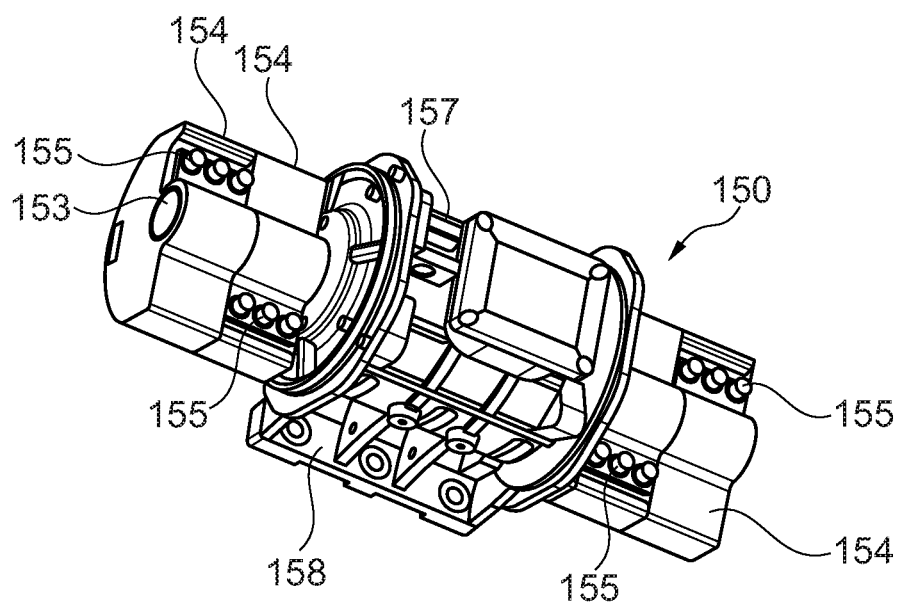
FIG. 10 shows a perspective front view of the vibration exciter in accordance with FIG. 9

FIGS. 8 to 10 show the excitation device of the invention in more detail. As FIG. 8 illustrates, two vibration exciters 150 are attached to the side of the bracket 140 facing away from the beam 130. The design of the two vibration exciters is shown in more detail in FIGS. 9 and 10. As these drawings show, the vibration exciters 150 have a housing. There are two drive motors in this housing 157. Each of these drive motors drives a shaft 153. The shafts 153 are routed out of the housing 157 and bear imbalance masses 154 at their ends. A clamping device 155 is used to secure the imbalance masses 154 on the shafts 153.

The clamping devices 155 permit the positioning of the imbalance masses 154 on the shaft 153 to be altered. For this purpose the clamping device 155 can be opened. Then the relevant imbalance mass 154 can be rotated around the axis of rotation of the shaft 153 to the extent desired. Then the clamping device 155 can be re-tightened. In this way, the two imbalance masses 154 of each shaft 153 can be positioned in relation to each other such that the desired imbalance is produced. In the arrangement shown in FIGS. 9 and 10, the imbalance is at its maximum, as both imbalance masses 154 are arranged on the shaft 153 having the same orientation.

The housing 157 has a flange 158. This flange 158 can be used to set the vibration exciter 150 on the bracket 140 and fasten it thereto using the fastening elements 151 described above.

The motors can be designed as electric, hydraulic or pneumatic drive motors, for instance.

FIG. 8 clearly shows the arrangement of the two vibration exciters 150 on the bracket 140.

Figure 11:
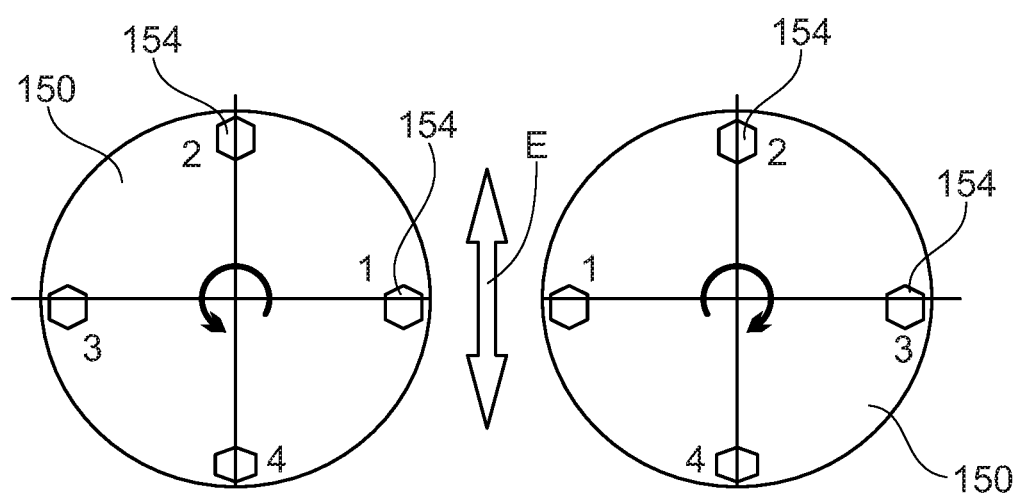
FIG. 11 shows a symbolic representation of an excitation device.

FIG. 11 shows symbolic depictions of the two vibration exciters 150 attached to the bracket 140. The function is briefly explained below using this illustration. The drawing shows the two vibration exciters 150 mounted on the bracket 140. Hexagons are used to symbolically represent the different positions of the imbalance masses 154. In detail, four positions are illustrated for every vibration exciter 150. In position 1, all imbalance masses 154, according to the arrangement as shown in FIGS. 9 and 10 of the two vibration exciters 150, face each other. Accordingly, the imbalance masses 154 in position 3 are located diametrically opposite from each other. The imbalance masses compensate each other accordingly. Positions 2 and 4 represent extreme positions between these two positions 1 and 3, in which the imbalances are added to each other. If the vibration exciters 150 are operated according to the directions of rotation shown in the drawing, a resulting force vector is obtained, which is depicted in FIG. 11 by a double arrow. This resulting force vector corresponds to the excitation direction E. As shown for example in FIG. 4, this excitation direction E preferably extends in the direction of the longitudinal extension 139 of the beam 130 (hollow section). The direction of longitudinal extension 139 of the closed hollow section is preferably within a range of plus or minus 15 degrees of the excitation direction E.

As FIG. 6 illustrates, and as mentioned above, there are two beams 130 on the underside of the bottom 92, each holding a reinforcing section 120. The two reinforcing sections 120 are identical in construction and are arranged mirror-symmetrically to the central longitudinal axis, which in FIG. 6 extends perpendicular to the image plane and in the direction of the image depth in conveying direction V. This results in a uniform transmission of force from the bracket 140, which absorbs the forces of the vibration exciters 150, into the bottom 92 and in that way into the feed chute.

A component width B results between the outer sides of the two reinforcing sections 120, as shown in FIG. 6. This component width B is at least 70% of the width of the bracket 140 in the direction of width B.

As the above descriptions explain, the invention thus concerns a feed unit for a processing plant. In the exemplary embodiment above, the invention was described in relation to a crushing plant of the jaw crusher type. Of course, the feed unit can also be used in a screening plant or a crushing plant of another type, e.g. impact crusher, cone crusher, etc.

The feed unit has a feed chute, which has a chute beam 90, wherein the chute beam 90 has a bottom 92, wherein the bottom 92 extends in the conveying direction V of the feed chute. The bottom 92 may also be referred to as a chute bottom 92. In the area of the underside of the bottom 92, at least one beam 130 extending in conveying direction V is arranged, which supports the bottom 92. Furthermore, a bracket 140 is provided, which supports at least one vibration exciter 150. The beam 130 is connected to the bracket 140 and forms a closed hollow section. Alternatively, at least one wall segment of the beam 130 in conjunction with a reinforcing section 120 connected thereto can also form a closed hollow section. The hollow section extends in the direction of the conveying direction V.

The invention claimed is:

1. A feed unit for a processing plant, comprising:
a feed chute including a chute bottom extending in a conveying direction of the feed chute;
at least one beam supporting the chute bottom;
a bracket attached to the at least one beam;
at least one vibration exciter supported from the bracket and configured to generate a vibration in an excitation direction; and
wherein the at least one beam includes a closed hollow section extending in a direction of longitudinal extension within a range of plus or minus 15 degrees of the excitation direction.

2. The feed unit of claim 1, wherein:
the closed hollow section includes first and second end segments at its longitudinal ends, the first end segment being connected to the chute bottom and the second end segment being connected to the bracket.

3. The feed unit of claim 1, wherein:
the direction of longitudinal extension of the closed hollow section extends at an angle less than 90 degrees to the chute bottom.

4. The feed unit of claim 1, wherein:
the direction of longitudinal extension of the closed hollow section extends at an angle in a range of from about 20 degrees to about 50 degrees to the chute bottom.

5. The feed unit of claim 1, wherein:
the direction of longitudinal extension of the closed hollow section extends at an angle in a range of from about 25 degrees to about 35 degrees to the chute bottom.

6. The feed unit of claim 1, further comprising:
at least one bracing element connected both to an outside of the hollow section and to the bracket, the bracing element projecting laterally beyond the outside of the hollow section at least in some areas.

7. The feed unit of claim 1, wherein:
the at least one beam includes a wall segment and a reinforcing section, the reinforcing section including:
a reinforcing section segment; and
first and second spacers connected to the wall segment and holding the reinforcing section segment at a distance from the wall segment to define an interior space of the hollow section between the wall segment and the reinforcing section segment.

8. The feed unit of claim 7, wherein:
the reinforcing section segment includes a depression recessed toward the interior space of the hollow section.

9. The feed unit of claim 7, wherein:
the reinforcing section segment includes first and second wall elements connected to the first and second spacers, respectively, the first and second wall elements being arranged at an angle to one another.

10. The feed unit of claim 9, wherein:
the reinforcing section segment further includes first and second connection segments interconnecting the first and second wall elements, respectively, the first and second connection segments being arranged at an angle to one another.

11. The feed unit of claim 1, wherein:
the at least one beam includes a wall element and a reinforcing section connected to the wall element to form the closed hollow section; and
the reinforcing section engages a side surface of the wall element and is welded to the side surface of the wall element with weld seams extending in the direction of longitudinal extension of the hollow section.

12. The feed unit of claim 1, further comprising:
a plurality of ribs extending transversely to the conveying direction and connected to the chute bottom.

13. The feed unit of claim 12, wherein:
the ribs are welded to an outside of the hollow section.

14. The feed unit of claim 12, wherein:
at least two of the ribs are connected to one another by at least one connection segment extending in the conveying direction.

15. The feed unit of claim 12, wherein:
at least two of the ribs are connected to one another by a flange; and
the feed unit further includes a spring connected to the flange.

16. The feed unit of claim 1, wherein:
the at least one beam includes first and second beams including first and second hollow sections, respectively, the first and second hollow sections being spaced apart from one another by a transverse spacing transverse to the conveying direction.

17. The feed unit of claim 16, wherein:
the bracket has a bracket width transverse to the conveying direction; and
a component width equal to the transverse spacing plus a transverse width of the first and second hollow sections is at least 70% of the bracket width.

18. The feed unit of claim 1 in combination with a mobile crushing or screening station.

* * * * *